US012254857B2

(12) United States Patent
McLaren

(10) Patent No.: US 12,254,857 B2
(45) Date of Patent: Mar. 18, 2025

(54) SOUND MANAGEMENT ENCLOSURE

(71) Applicant: Logan B McLaren, Royal Oak, MI (US)

(72) Inventor: Logan B McLaren, Royal Oak, MI (US)

( * ) Notice: Subject to any disclaimer, the term of this patent is extended or adjusted under 35 U.S.C. 154(b) by 279 days.

(21) Appl. No.: 17/934,528

(22) Filed: Sep. 22, 2022

(65) Prior Publication Data

US 2023/0014683 A1 Jan. 19, 2023

Related U.S. Application Data

(63) Continuation-in-part of application No. 17/377,930, filed on Jul. 16, 2021, now Pat. No. 11,490,183.

(51) Int. Cl.
*G10K 11/16* (2006.01)

(52) U.S. Cl.
CPC .................................... *G10K 11/16* (2013.01)

(58) Field of Classification Search
None
See application file for complete search history.

(56) References Cited

U.S. PATENT DOCUMENTS

| | | | | |
|---|---|---|---|---|
| 4,884,655 | A | 12/1989 | Freadman et al. | |
| 5,996,728 | A | 12/1999 | Stark | |
| 2021/0258668 | A1 * | 8/2021 | Lu | H04R 7/12 |

* cited by examiner

*Primary Examiner* — Kile O Blair
(74) *Attorney, Agent, or Firm* — The Rapacke Law Group, P.A.; Andrew Rapacke

(57) ABSTRACT

A sound management enclosure, production, and recapture device may include a generally symmetrical design and may be constructed and arranged to optionally internally mount components therein. The sound management device may be constructed and arranged to alter, focus, or dissipate sound waves within a predictable environment in order to enhance the associated effects. Sound capturing devices, such as microphones, may be placed within the sound management enclosure for transmission to an external system for recording or projection.

19 Claims, 14 Drawing Sheets

SOUND MANAGEMENT ENCLOSURE

CROSS-REFERENCE TO RELATED APPLICATIONS

This application claims the benefit of U.S. Non-provisional application Ser. No. 17/377,930 filed Jul. 16, 2021, which is incorporated wholly herein by reference.

TECHNICAL FIELD

The field to which the disclosure generally relates includes sound production and recording.

BACKGROUND

In a studio recording environment, the management of sound projecting and capturing equipment incorporates a large number of options for varying positions of speakers, microphones, accessories, and also includes the use of chambers, materials, techniques, and the like. Strategic placement of equipment is intended to generate and provide for capture of the sound result by combining or isolating contributing factors that influence those sounds based on the preference of the artist or recording engineer in general. Providing options available for making alterations within an environment provides for more comprehensive sound management.

Sound isolation cabinets are generally designed to allow for the capture of increased amplifier power outputs while reducing the exposure of those volumes to the surrounding area. Vintage amplifiers are preferred in many instances due to the use of tube circuits that generally produce warmer sound quality, and with higher power settings tend to produce a natural break up of the signal that results in commonly known distortion. Isolation cabinets reduce the related external volume intensity that may affect or damage hearing, and also likely disturb the surrounding environment. "Blare" can be used to describe the undesirable effect of higher intensity sound waves that are too intense for the listener to enjoy in immediate proximity. These higher volumes can also have an effect on other instruments played in the surrounding area. The disruption is common during recording wherein the influence over other sound projection and capturing efforts intended for other voices or instruments is of primary concern.

These enclosures generally rely on wall thickness, mass or "Bulk" to inhibit sound transmission to the external environment. In some instances, a method known as decoupling is used which is intended to isolate an amplifier or speaker by simply suspending it within the environment by using hangers inside the cabinet. The result is intended to reduce the severity of vibrations from transmitting to the external environment while creating an additional air volume barrier between the sound source and the enclosure walls. In some examples, the amplifiers themselves are positioned within the enclosure, which generally results in a buildup of heat that is likely to cause serious issues with regard to temperature sensitive materials and electronics. In addition, the standard industry designs in some cases are constructed with excessively sized walls that result in oversized enclosures, not easily transported or shipped within known standards for package girth limitations.

SUMMARY OF ILLUSTRATIVE VARIATIONS

A sound management enclosure, production, and recapture device may include a generally symmetrical design and may be constructed and arranged to optionally internally mount components therein. The sound management device may be constructed and arranged to alter, focus, or dissipate sound waves within a predictable environment in order to enhance the associated effects. A speaker may be mounted within the sound management enclosure and may be positionable within the enclosure via an optional slide system. Sound capturing devices, such as microphones, may be placed within the sound management enclosure for transmission to an external system for recording or projection. A variety of input and outputs may allow for the receiving of signals and transmission to an external system for recording or projection.

A sound management enclosure capable of altering, focusing or dissipating sound waves within a predictable environment designed to enhance the associated effect(s). Microphone(s) placed in locations within the environment capture sound events for transmission to an external system for recording or projection.

Other illustrative variations within the scope of the invention will become apparent from the detailed description provided herein. The detailed description and enumerated variations, while disclosing optional variations, are intended for purposes of illustration only and are not intended to limit the scope of the invention.

BRIEF DESCRIPTION OF THE DRAWINGS

Examples of variations within the scope of the invention will become more fully understood from the detailed description and the accompanying drawings, wherein.

DETAILED DESCRIPTION OF ILLUSTRATIVE VARIATIONS

Figure 1:
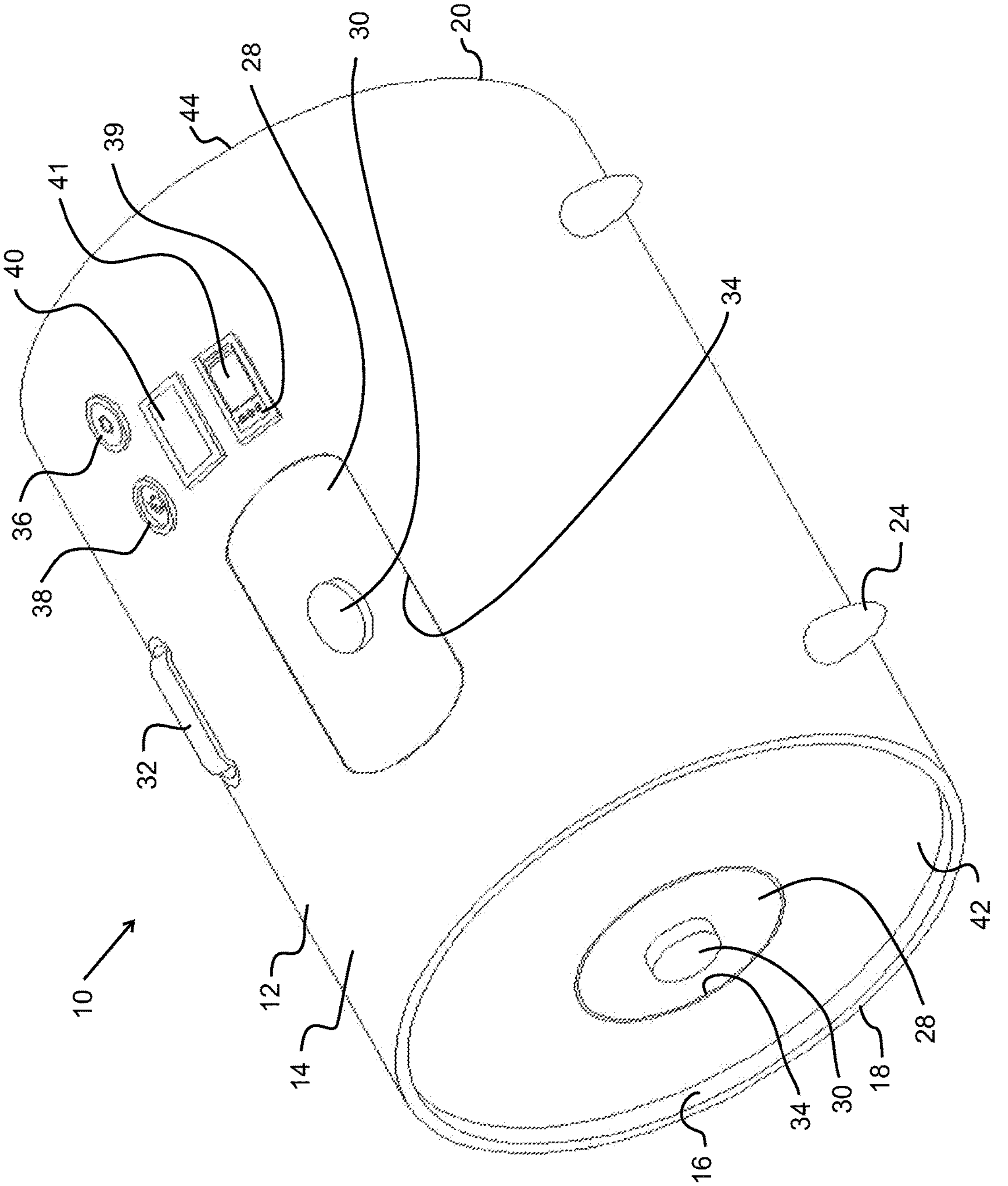
FIG. 1 depicts one variation of a sound management enclosure as described herein.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still within the scope of the invention.

A sound management enclosure, production, and recapture device may include a reasonably symmetrical design and may be constructed and arranged to optionally internally mount components therein. The sound management device may be constructed and arranged to alter, focus, or dissipate sound waves within a predictable environment in order to enhance the associated effects. Sound capturing devices, such as microphones, may be placed within the sound management enclosure for transmission to an external system for recording or projection.

A sound management enclosure capable of altering, focusing or dissipating sound waves within a predictable environment designed to enhance the associated effect(s). Microphone(s) placed in locations within the environment capture sound events for transmission to an external system for recording or projection.

A method may include providing a portable studio enclosure wherein the internalized intersecting points of sounds provide for both constructive and destructive opportunities for varied sound properties. The varying of absorbing or reflecting panels, the manipulation and effect of air pressures both on sound waves and speaker performance, combinations of speakers and microphone(s) and their locations, all contribute to the options available in generating and capturing the sound result. The system also provides for a means to manage, limit or reduce entirely the vibrations caused by the production of sounds, both from the mechanical movement of equipment and also the projected result, both of which contribute to transmission of vibrations through surrounding mediums, likely resulting in an auditory signal.

The symmetrical design of the unit contributes greatly to the overall purpose of its operation. With the enclosure being designed around the speaker, there are several improvements in the general function of the unit. With a minimal cross section size in relation to the speaker the unit has a smaller external dimension but more importantly takes advantage of the symmetrical internal environment, which enhances the effect of sound wave management.

The basic symmetrical shape provides the advantage of redirecting sound waves back to a centralized position wherein predictable angles of incidence can be anticipated. This contributes to the constructive and destructive interference of the sound waves which has a substantial effect on their intensity and character. The acoustic interferometry can be defined in terms of angles of incidence relating to complex mathematical wave forms. Prior to, during and after this interaction, there are opportunities for the capture of sounds created that are in the interest of artist exploration. Prior to waves encountering any disruption, the sound wave is considered unimpeded and exists in its natural state as it continues to project outward. Sound waves that encounter barriers, reflectors, or simply encounter other sound waves through reflection or refocusing methods are all subject to intensity and character changes producing dramatically varied results. Since wave forms continue to propagate outward until being fully dissipated, any resulting sound emissions are also available for capture based on user preference. When sound waves are redirected in any one of the described options above, additional effects can be created such as natural chorus or reverb.

The unit being symmetrical in design provides the most efficient way of mounting an internal speaker that is likely similar in shape. Any speaker or sound generating mechanism, electronic of otherwise can be used. An industry wide knowledge of Rock & Roll history places high emphasis on twelve-inch speakers, and in particular twelve-inch speakers sold under the trademark Celestion Greenback that is popular with artists and speaker cabinets frequently used for live events. Types of music tend to gravitate toward ideal amplifier/speaker combinations used in the representations of those preferred sounds. Jazz speakers tend to identify as having high clarity and dramatic response. Rock and Heavy Metal speakers have components specifically intended to dramatically distort and break up the projected sound result.

The unit has an additional design that can change the angle of the speaker within the enclosure. This change can provide an alteration from a central position to a tilted or angular position, which can also be offset from center. Methods of operation include multiple options for locating a microphone in an alternate position to capture differing sounds along the sound wave path in relation to the speaker position. The first method involves turning the speaker in one dimension, which has the effect of pointing the center of the speaker to a central position along the side wall, which due to its inwardly curved profile absorbs or reflects those sound waves in a predictable method or direction. The second method involves tilting the speaker in an offset position which has the effect of pointing the speaker to a non-symmetrical position within the enclosure which creates complex sound reflections that can result in natural chorus or reverb effects.

The management of air pressures as they relate to both mechanical components and the influence they have on sound waves and ultimately the result obtained through microphones is provided. Sound waves subjected to varying air pressures can change in sound character and tend to react dramatically to ambient airflows and interactions. Speaker performance can also be influenced by the available air volumes in that any change in available air volume surrounding the speaker can affect the physical performance of the speaker itself. As the speaker cone moves it tends to compress the air in the direction it is moving while the opposite side of the speaker is subjected to a decrease in air pressure, resulting in a vacuum. Adjusting the available air volumes both in front and behind the speaker can be accomplished by changing the speaker position in relation to the enclosure end panels both in front and behind the speaker or independently moving the end panels inside the enclosure to positions closer to or further away from the speaker itself. Maintaining those pressures can cause the speaker to be impeded or delayed in operation or cause the speaker to rebound to its original position much more quickly resulting in a "punch" effect. Alternately, by providing adjustable air ports surrounding the speaker, air pressure flow can be modified from front to rear of speaker and vice versa to the extent that open air flow will have no discernable effect on speaker performance. As the speaker cone moves during general operation, the resulting generation of air pressure waves also influences internal components within the enclosure. These components intended to contribute sound effects, can be suspended in such a way to be deliberately influenced by air pressure waves. Chimes, shakers, wooden blocks, and the like, are examples of items that can be mounted within the unit to take advantage of air pressure waves to create additional sound effects. As intensity of speaker movement and sound generation increase, the effect becomes more pronounced within the environment. In addition, by establishing a symmetrical environment designed around a circular shaped speaker, the effects can become more pronounced. Also, when speaker aspect angles are changed from a centralized position to an alternate direction, the resulting air pressure changes become more dramatic, and this effect has a tendency to alter pressure waves and ultimately produce differing sound events all of which provide further options in providing a user with additional sound experimentation. The ability to vary the physical motion of the speaker by altering the environment can produce results such as rebound, punch or sustain of the speaker cone itself, all of which influence the ultimate sound quality characteristics.

For the basic operation of dissipating and ultimately reducing sound waves within an environment, sound absorbing foam panels are well known within the industry, each of which either by design, volume or density all have varying degrees of effect on sound absorption. These panels are used in the general operation of the unit and are mounted in ideal configurations with regard to fit and function. An internal liner of a felt product is ideally suited to provide a thin barrier between the paper-based cylinder shape (also the metal dual hull design). This product provides several functions including firstly a change in sound barrier medium that effects change in sound wave transitioning through the barrier wall that ultimately serves to reduce transmission quickly. Secondly the underlying substrate is better protected while providing a soft barrier unlikely to damage any equipment or sound absorbing foam panels. Thirdly the felt product is ideally suited for Velcro adherence, so that mounting of internal components can be performed by directly attaching them to the felt liner in any desired position. Vinyl and other coverings sold under the trademark Tolex may be used as an external covering and is a commonly known and used throughout the music industry as it provides reasonable scratch and impact protection as well as providing many options with regard to thickness, color, patterns or embossing.

The unit is designed to be as lightweight and portable as possible so that it generally falls within the industry standard shipping guidelines that provide for basic weight and dimension restrictions. This makes the unit more cost effective when considering premiums that can be paid for overweight or oversize packages during shipping. It also makes transporting the unit in general by the user as convenient as possible.

Use of different speaker and microphone combinations produce a wide array of sound capturing combinations and also allow for mounting in varying positions. Speakers and microphones can easily be substituted by using quick release mounts. Any audio transducer or means of moving air or another medium to produce sounds can be used. For example, piezoelectric benders, which are small flat plates without electromagnetic coils, can be used to produce sound. Microphone positions can be altered utilizing different mounting methods that can provide for easy manipulation or lockable positions, so that normal use or vibration does not alter the desired location. Microphones can be placed at any desired position within the environment both in front of and behind the speaker to capture any projection of sound emanating from the speaker at any given orientation angle. Multiple microphones can also be used in combination and positioned within the enclosure so that multiple outputs can be provided to a mixing console or multiple receiving locations that can combine and manage the individual sound results.

Design options include utilizing a paper or fiber-based cylinder construction, which is very effective at absorbing sound waves while greatly reducing production costs. This construction provides a consistency of the sidewall and significantly reduces vibrations while providing for a mountable substrate that is comparatively light in comparison to other materials. In another embodiment, a dual hull design is constructed with metal sheeting that creates a vacuum void between the inner and outer wall that fully surrounds the internal environment and serves to eliminate the ability of sound waves to transmit to the outside of the enclosure by removing the air medium providing the conduction of the sound waves.

Movement of the speaker or microphones within the sound environment can be accomplished by using an external mechanism, being mechanical or electrical in design, that provides for a real time repositioning of the microphone or speaker remotely. In addition to changing the sound result, this movement also provides a real time control of sound projections when the internal components are exposed to the external environment. This provides a substantial entertainment function when directional outputs change in relation to the audience during a performance.

Circuitry can be provided for enhancing options related to the power interaction between the amplifier and the speaker. Power loads to the speaker expressed in terms of amplifier ohm settings, voltages, wattages, and the like can be managed by utilizing electrical circuit components placed in switchable paths, intended to simulate speaker loads or simply provide safety circuits that reduce the possibility of damaging the speaker or the amplifier. This allows for the utilization of mismatched amplifier/speaker combinations, which is common to multiple speaker configurations or the differing speakers themselves. In addition, power meters can be incorporated that display incoming power levels can help to assist the user in safely managing power usage in relation to speaker components. All of which provide the user with options for utilizing equipment that may not be entirely compatible or recommended but nonetheless are available for producing sound options.

The unit can be manufactured with or without multiple port locations for accessing the inside of the enclosure, both along the cylinder wall or at the end plates. An ideal Port Door design incorporates a user manipulated plate rotating on an axis intended to extend arms toward the Port door perimeter which upon extending, moves the arms through port door edge, to the enclosure edge wall thereby locking the port door to the enclosure and sealing the opening. A method is provided to vary the microphone position within the unit without opening the port door. When coupled with a viewing window, this option provides a way to view the position of the microphone in relation to the speaker in order to assist in determining how sounds vary as adjustments are being made and captured by the microphone. In one embodiment the wand has the ability to extend, retract, rotate or change the aspect angle of the microphone toward or away from the speaker, providing a way to change the position of the microphone within the environment without opening the enclosure.

Additional options are available for mounting a speaker within the enclosure with consideration for how it can be relocated and secured. These methods include but are not limited to; mounting the speaker on an expansion ring that provides for repositioning and securely remounting the speaker to the sidewall utilizing a friction base, or by a telescoping pad system mounted to the perimeter of the speaker engaging the sidewall.

Basic operation begins with opening the unit via an optional port door or removable end cap and inspecting the internal environment. The initial placement of the microphone in front of the speaker is guided by the principle that the closer the microphone is to the speaker itself, the more intensified the transmitted result will be. After securing the microphone in an initial position, the port door or end cap is reinstalled so that the enclosure is sealed and ready for use. At this point the artist connects an instrument to an amplifier, that is generally suited to match the speaker installed within the unit. The amplifier is then connected to the input jack on the unit exterior, which will then transmit the power signal directly to the internal speaker. Upon driving the speaker, microphone(s) located within the unit capture the sound result and return it to a jack mounting point on the outside of the unit. A commonly used audio connector (¼ jack or XLR) is available for the user to connect the output jack to an external sound board input, recording console input or to an audio speaker. Changing the instrument volume or tone output or the amplifier power or sound settings can initially modify the internal speaker sound result. By opening the unit port door or end cap, the microphone(s) can be easily repositioned in relation to the speaker or internal environment itself based on the user preference. The speaker itself in further design embodiments can also be changed as a matter of preference. In addition, internal air baffles, sound absorbing material, reflectors, and the like can all be manipulated within the internal environment that will also have an effect on the sound result. Bungee cords and hook-and-loop tabs are effective in securing any reflective or absorbing panel within the unit simply by attaching it to the felt liner. Other design embodiments provide the user with additional options with regard to repositioning the speaker and microphone in relation to the internal environment including but not limited to slide systems, mounting tracks, bulkheads, pole mounts, orbiting speaker mounts, and the like.

Referring to FIG. 1, a sound management enclosure 10 may include a housing 12 having an outer surface 14 opposite an inner surface 16. The housing 12 may have a first end 18 opposite a second end 20. A first end cap 42 may sealingly close an open first end 18 and a second end cap 44 may sealingly close a second open end 20. The housing 12 may be generally cylindrical in shape. A plurality of stabilizing feet 24 may be disposed on the outer surface 14. A handle 32 may be affixed to the outer surface 14 and may be constructed and arranged to assist in transportation of the sound management enclosure 10. The housing 12 and either end cap 42, 44 may define one or more access ports 34 which may receive an optional port door 28 which may include a locking mechanism 30. The sound management enclosure may include a variety of inputs and outputs 36, 38, in addition to various components for the visual display of data such as a power meter 40. The sound management enclosure may include electronic aids such as a switchable power load circuit 39 and battery pack 41.

Figure 2:
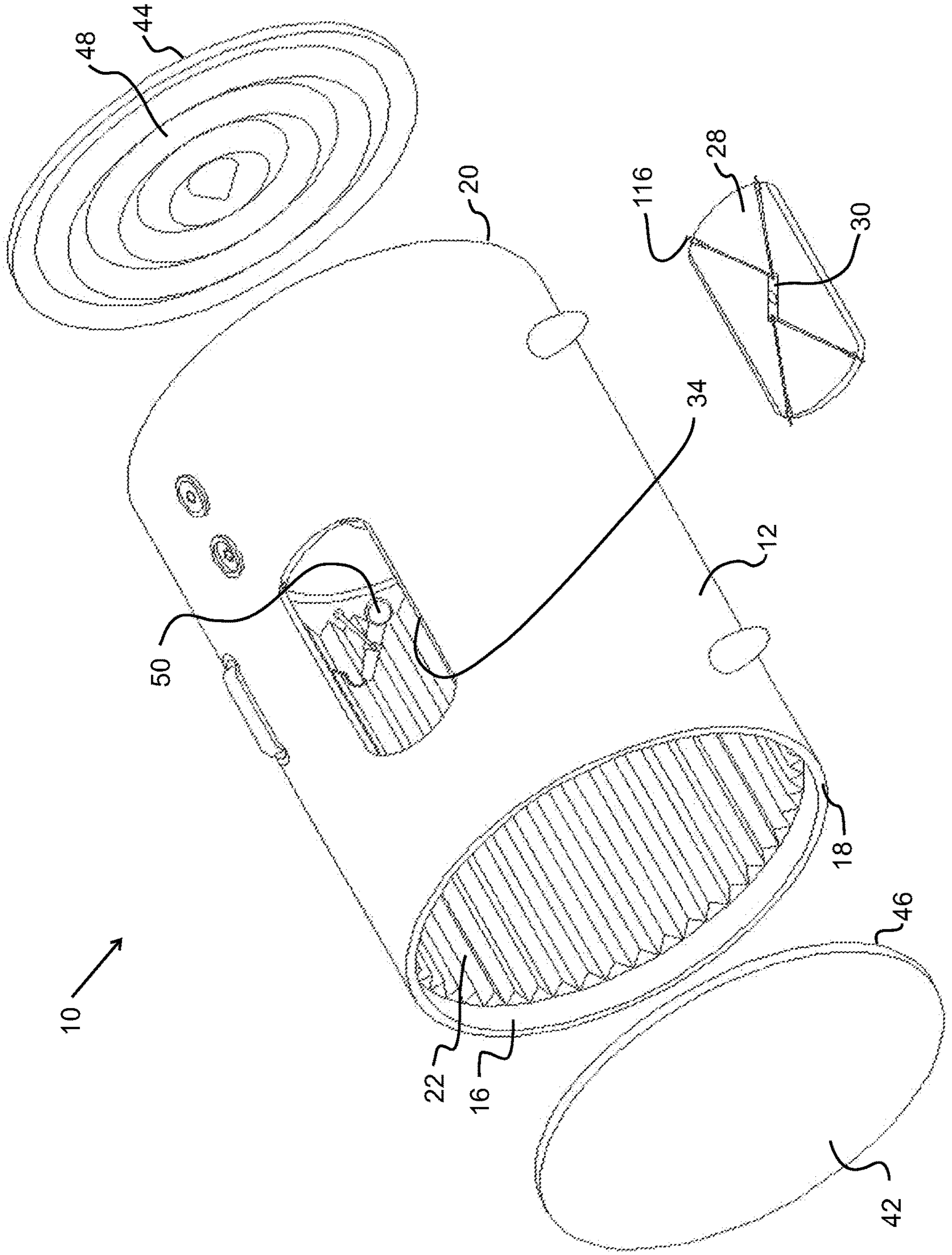
FIG. 2 depicts an exploded view of one variation of a sound management enclosure as described herein.

Referring to FIG. 2, a sound management enclosure 10 may include a housing 12 constructed and arranged to house a microphone 50. A first end cap 42 may sealingly close an open first end 18 and a second end cap 44 may sealingly close a second open end 20. The first endcap 42 may include a sound absorbing material 46 disposed thereon, and the second end cap 44 may include a sound absorbing material 48 disposed thereon, such that when the first end cap 42 and the second end cap 44 may close within the housing 12. A sound absorbing material 22 may be disposed on the inner surface 16. The housing 12 may define an access port 34 which may receive an optional port door 28 which may include a locking mechanism 30 having extension pins 116 constructed and arranged to affix the port door 28 within the access port 34. The sound management enclosure 10 may be constructed and arranged to alter, focus, or dissipate sound waves within a predictable environment.

Figure 3:
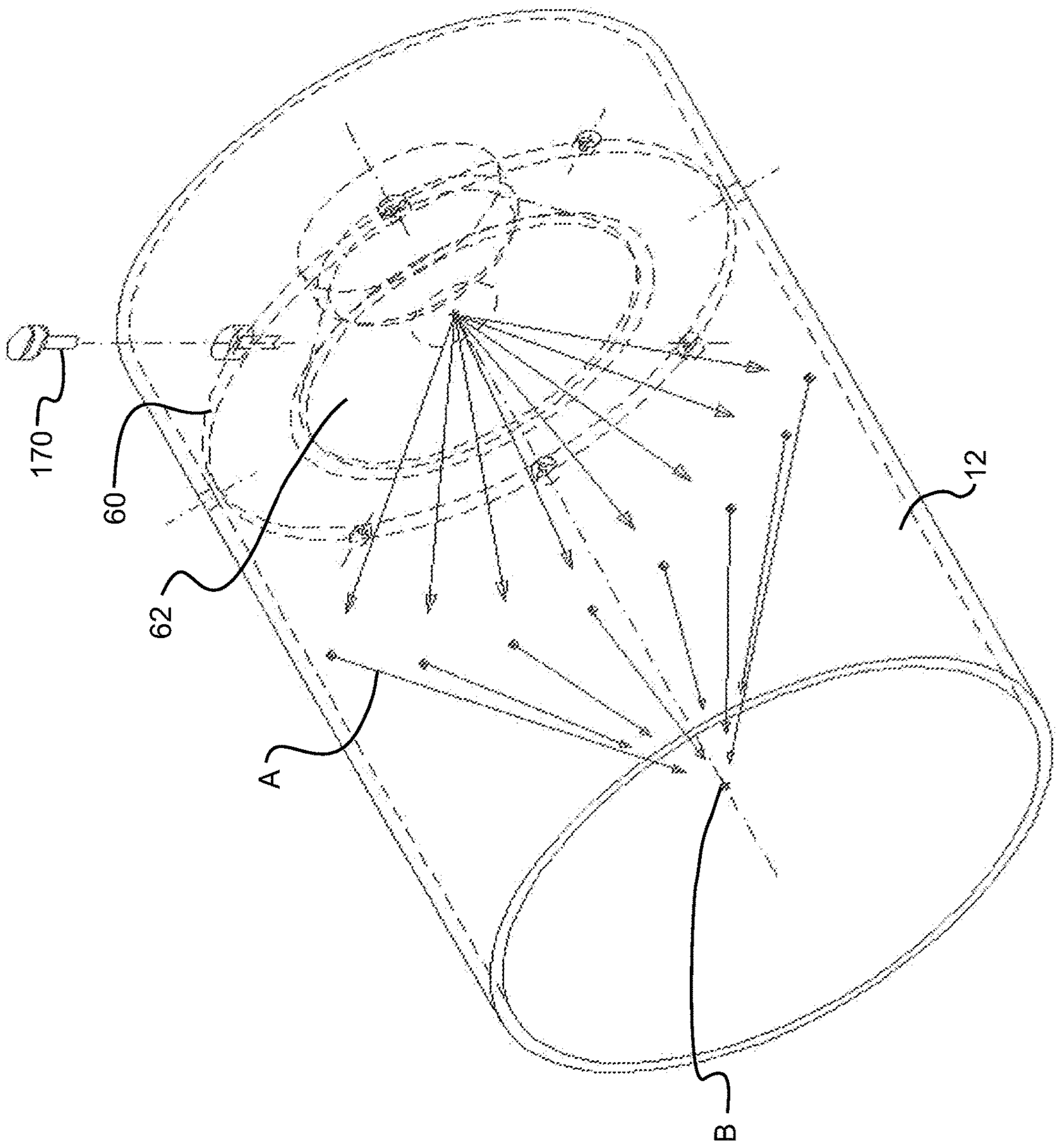
FIG. 3 depicts a partially see-through view of the management of sound waves within one variation of a sound management enclosure as described herein.

Referring to FIG. 3, a sound management enclosure may include a housing 12 constructed and arranged to house a speaker 62 therein, such as within a hollow portion defined by the housing 12. The housing 12 may include a first open end opposite a second open end, or at least one closed end, or multiple closed ends. The sound management enclosure may be constructed and arranged to alter, focus, or dissipate sound waves in a predictable manner such as the predictable reflectance of sound waves "A" to an anticipated focal point "B" within the enclosure. As seen in FIG. 3, the housing 12 may be generally symmetrical, such as approximately cylinder, however, variations on the housing still fall within the scope of this disclosure. As will be seen in the varying figures, and in particular FIG. 10 or FIG. 13*a*, various sound absorbing liners or reflective layers within the housing 12 or portions of the housing 12 may reduce undesirable noise or increase intensity captured by a microphone optionally disposed within the enclosure. Similarly, a speaker 62 optionally disposed within the housing 12 may be disposed within or may be positionable to further improve acoustics. Optional isolator(s) 170 may be constructed and arranged to securely mount a speaker mounting disc 60 within the housing 12 or to mount a speaker 12 directly to the housing 12. Isolator(s) 170 may be a vibration damping fastener.

Figure 4:
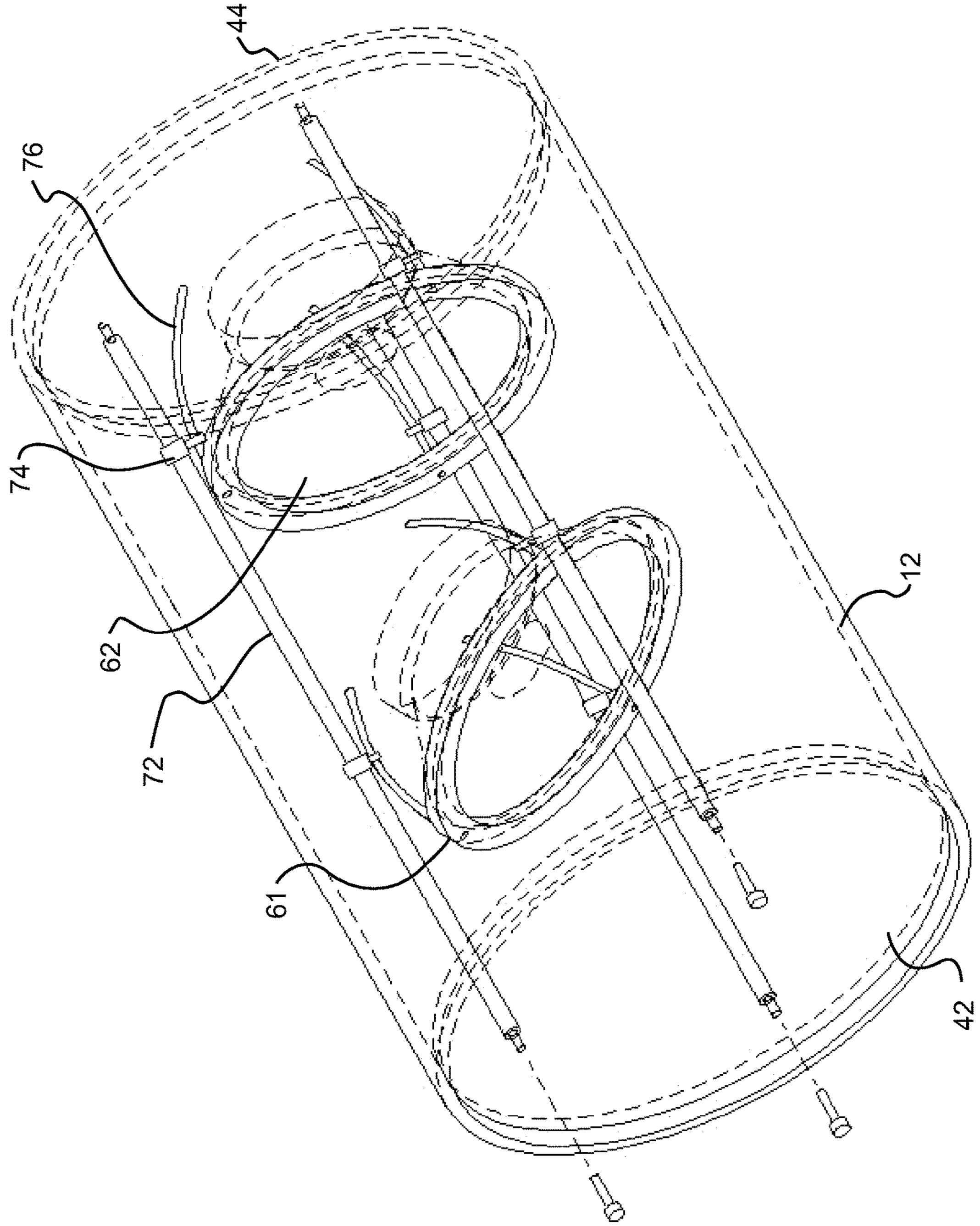
FIG. 4 depicts a partially see-through view of an optional slide system within one variation of a sound management enclosure as described herein.

Referring to FIG. 4, a sound management enclosure may include a housing 12 slidably attached to an optional slide system 72. The slide system 72 may be slidably attached to the inner surface of the housing 12 or either end cap 42, 44. The slide system 72 may be a plurality of poles disposed within the housing 12 such that the speaker 62 may be positionally adjustable within the housing 12. As best seen in FIG. 4, the slide system 72 may be constructed and arranged to allow adjusting of the speaker position by adjusting yaw or pitch. Speaker 62 may be affixed to an orbiting frame 61 which may also be slidably attached to the slide system 72 wherein the speaker 62 may be permitted to roll relative to the slide system 72 as an affixed part of the orbiting frame 61. Optionally, an orbiting frame arm 76 may further facilitate the attachment of the speaker 62 to the slide system 72. Speaker 62 is shown in two distinct positions within the housing 12 and on the slide system 72. A plurality of pole clamps 74 may facilitate attachment of the speaker 62 to the slide system 72.

Figure 5:
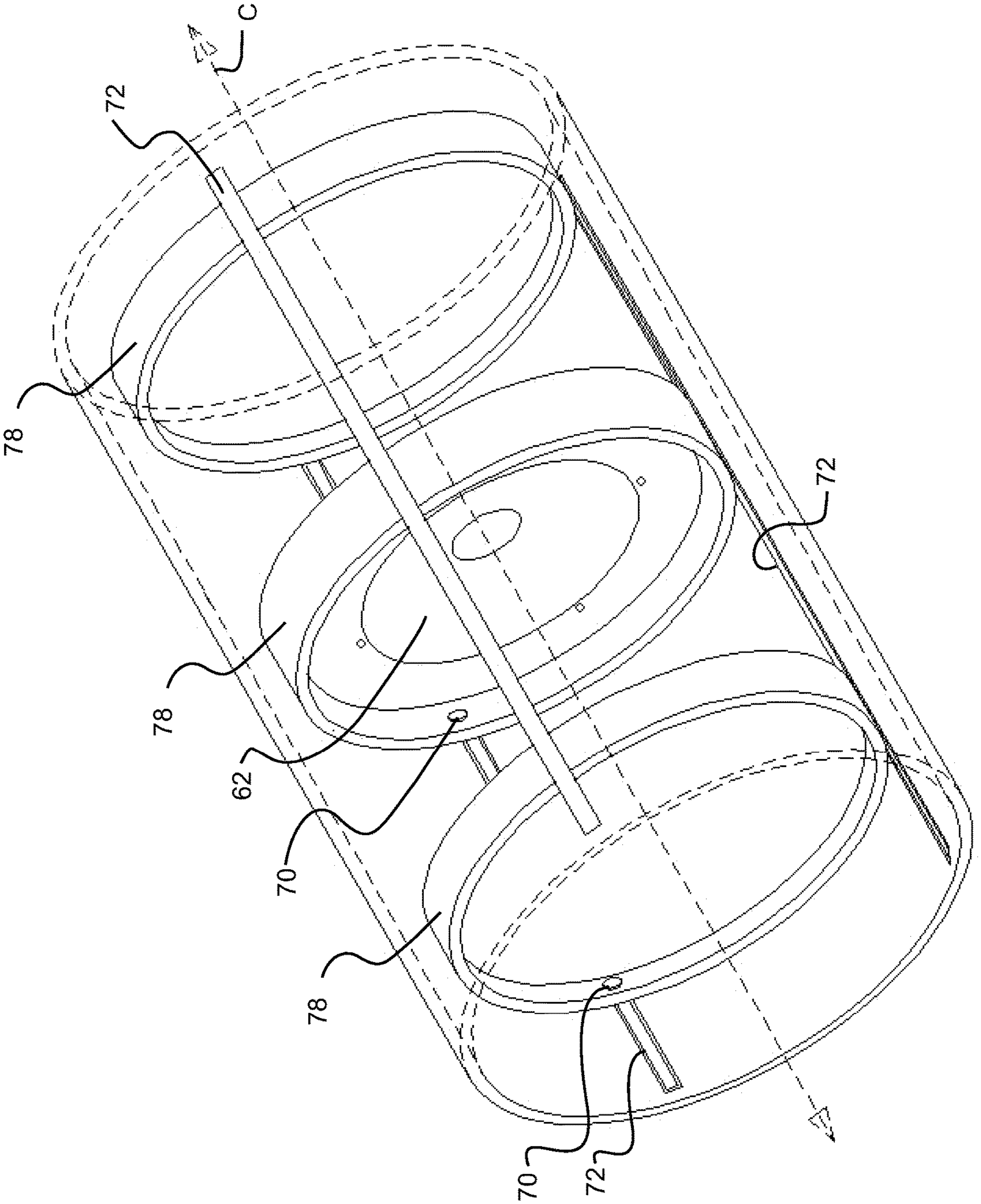
FIG. 5 depicts a partially see-through view of an optional slide system and moveable bulkhead incorporation in one variation of a sound management enclosure as described herein.

Referring to FIG. 5, a sound management enclosure may include an optional slide system 72 constructed and arranged to slidably retain a speaker 62 within the enclosure. The slide system 72 may be constructed and arranged to allow speaker 62 to be positioned along the longitudinal axis "C" of the enclosure. The slide system 72 may additionally be constructed and arranged to include moveable bulkheads 78 which may also be positioned and secured in place along the longitudinal axis "C" of the enclosure utilizing a locking mechanism 70. A number of moveable bulkheads 78 may be positioned on the slide system 72 to enhance the alteration, focus, or dissipation of sound waves within the enclosure in addition a number of moveable bulkheads 78 may be positioned on the slide system 72 to alter the available air volumes both in front and behind the speaker by increasing and/or decreasing the available air volumes therein.

Figure 6:
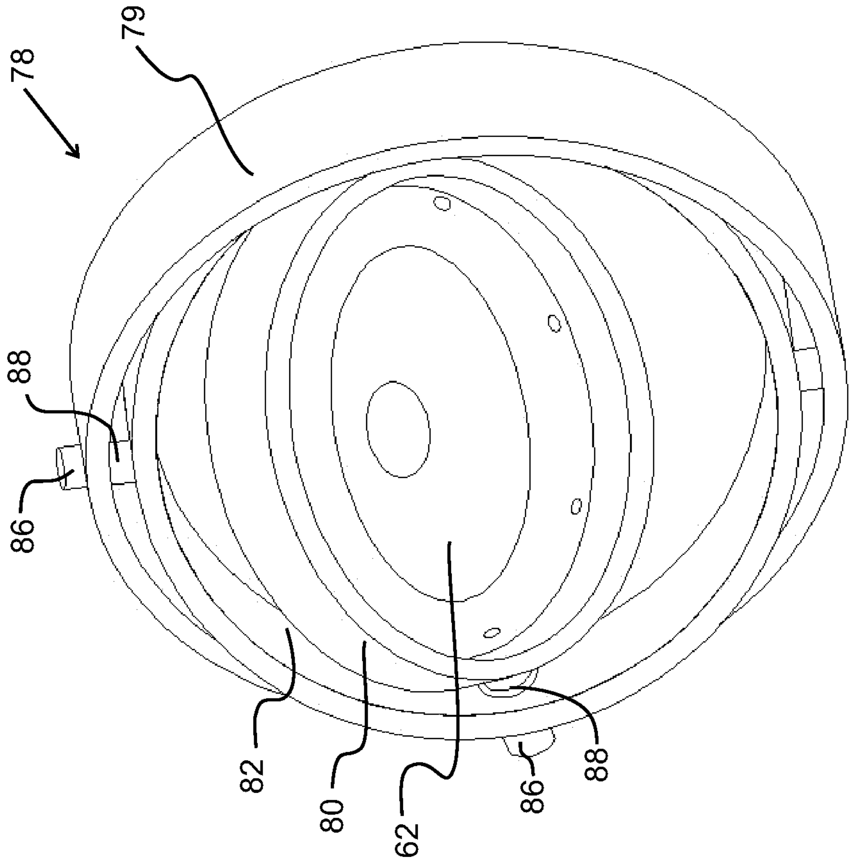
FIG. 6 depicts one variation of a dual pivot ring system for use within a sound management enclosure as described herein.

Referring to FIG. 6, a bulkhead support ring 79 may include a dual pivot ring system that may include a speaker 62 mounted to a first ring 80 pivotably connected to a second ring 82 which may be pivotably connected to a bulkhead support ring 79 as a component assembly of a moveable bulkhead 78 as described in FIG. 5. The bulkhead support ring 79 may be mounted to a housing or a slide system such that the moveable bulkhead 78 with dual pivot ring system may move within the housing. Additionally, the dual pivot ring system may be mounted directly to the housing in place of the bulkhead support ring. The dual pivot ring system may include a plurality of pivot control arms 86 in operable communication 88 with the first ring 80 and the second ring 82. The dual pivot ring system may be constructed and arranged to allow a user to adjust the pitch and yaw of the speaker 62 within the housing 12 via the pivot control arms 86. According to some variations, the dual pivot ring system may include a plurality of drive motors or external mechanical influence in operable communication with the first ring 80 and the second ring 82 such that pitch and yaw may be controlled via the plurality of drive motors or external mechanical influence.

Figure 7B:
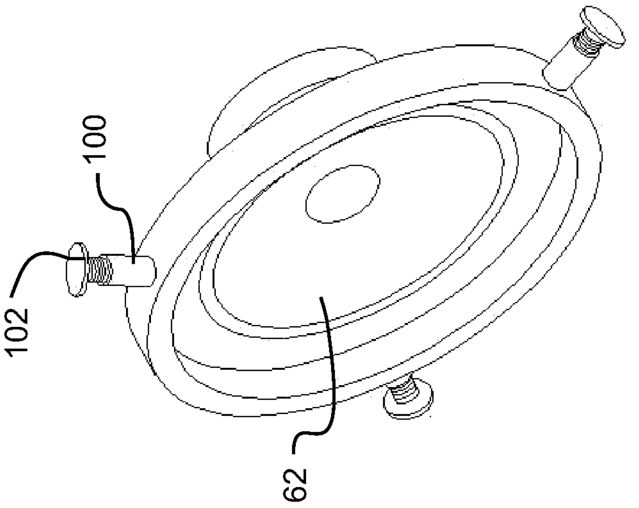
FIGS. 7A and 7B depict variations of an expansion ring and telescoping pads system within a sound management enclosure as described herein.
Figure 7A:
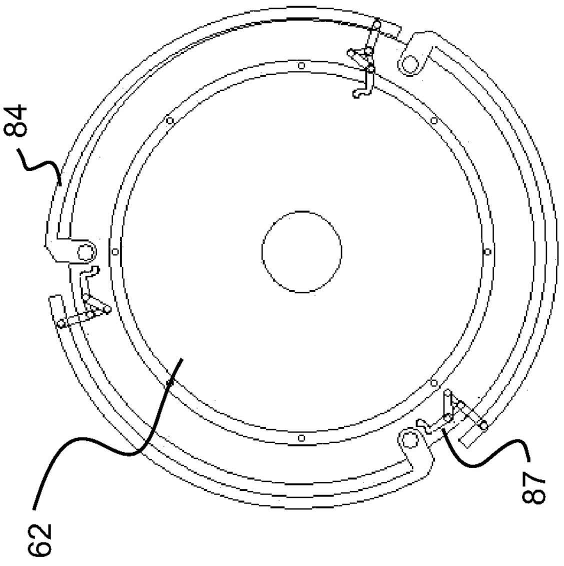

Referring to FIG. 7*a*, the housing 12 may include a speaker 62 disposed therein by an expansion ring 84 including a plurality of radial and circumferential expandable extensions 87 constructed and arranged to expand and retract the circumference of the expansion ring 84 such that the speaker 62 may be positioned and secured within the housing 12. Referring to FIG. 7*b*, the speaker 62 may be positioned within the housing 12 by means of various telescoping pads 102 affixed to the speaker mounting disc 60 via threaded sleeves 100 and extending to a portion of the housing 12 such that a user may adjust the position of the speaker 62 within the housing 12 via the telescoping pads 102.

Figure 8:
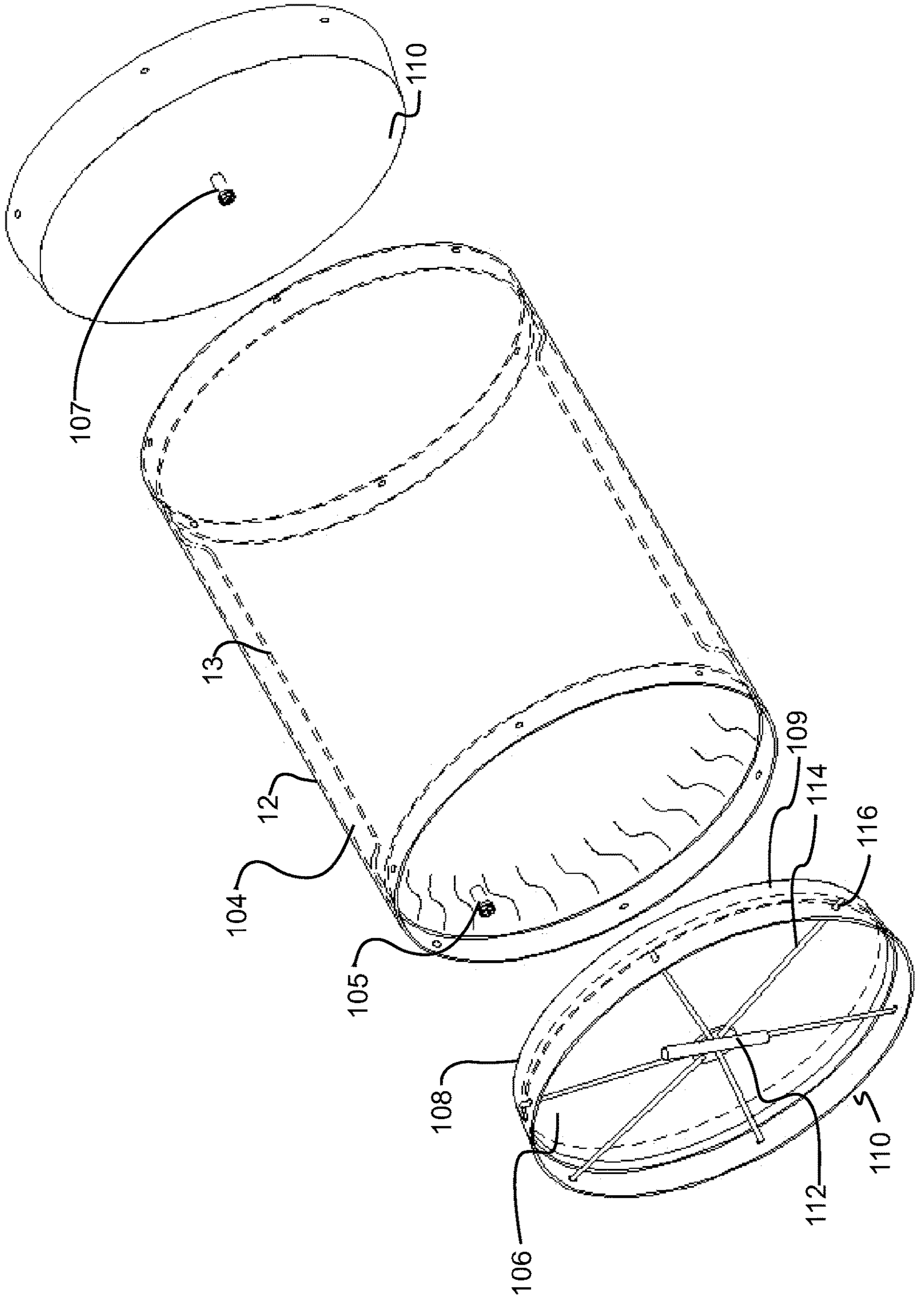
FIG. 8 depicts one variation of a double walled vacuum vessel having locking end caps within a sound management enclosure as described herein.

Referring to FIG. 8, according to some variations, the housing 12 may be a double walled vacuum vessel that may include a multi-housing construction including an inner housing 13, a vacuum void 104 being defined between the inner housing 13 and the housing 12 according to the view in FIG. 8. A vacuum valve 105 may be disposed through the housing 12 or inner housing 13 and in operable communication with the vacuum void 104 and may be constructed and arranged to allow the creation of a vacuum between the inner housing 13 and the housing 12. The sound management enclosure may include a housing 12 that may be generally cylindrical in shape and may receive one or more end caps 110 constructed and arranged to sealingly mate with one or both of the open ends of the housing 12 wherein the end cap 110 may include an outer housing 108 constructed and arranged to sealingly mate with the housing 12, and a locking mechanism that may include a lock handle 112, in operable communication with locking shafts 114 and extension pins 116, wherein the locking pins may extend through a portion of the housing 12 such that the end cap 110 may sealingly close the housing 12. The end cap 110 may include an additional vacuum valve 107 disposed through the end cap 110 and in operable communication with the inner housing 106 or outer housing 108 and may be constructed and arranged to allow the creation of an end cap vacuum void 109 within the end cap 110 being defined between an inner housing 106 and an outer housing 108 of the end cap. The end cap 110 may be constructed and arranged to engage with the double wall vacuum vessel as disclosed in FIG. 8 or any other of the disclosed sound management enclosures discussed herein.

Figure 9B:
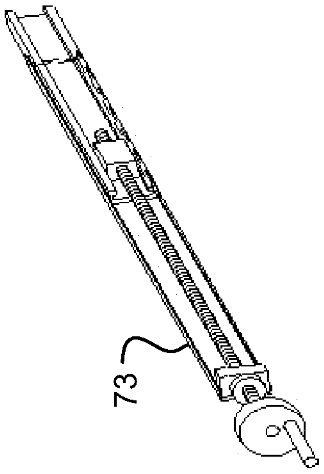
FIG. 9*b* depicts one variation of a drive mechanism within a sound management enclosure as described herein.
Figure 9A:
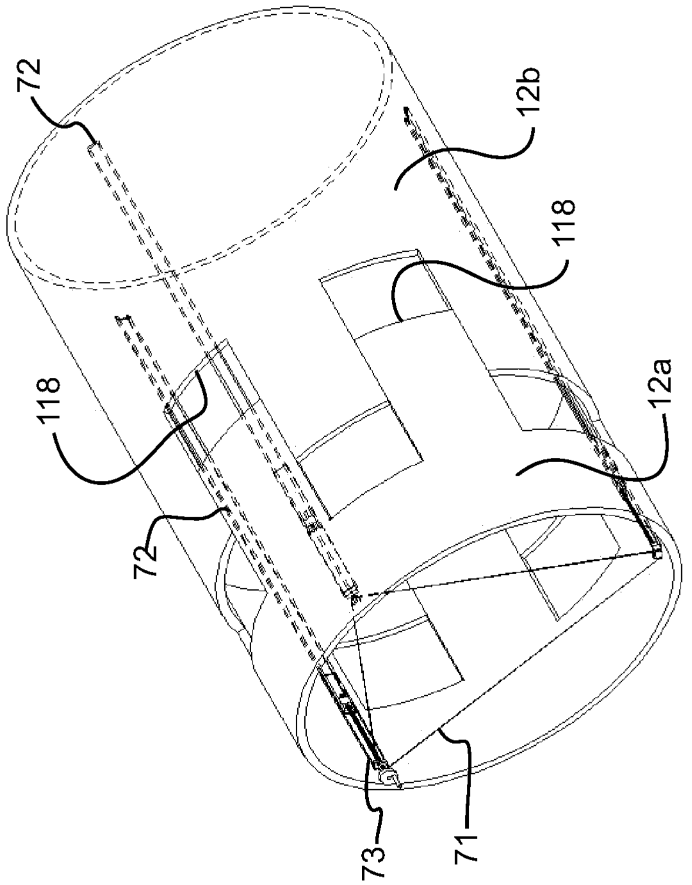
FIG. 9*a* depicts one variation of a separable housing design within a sound management enclosure as described herein.

Referring to FIGS. 9*a* and 9*b*, the housing may include a separable housing design including a first housing portion 12*a* and a second housing portion 12*b* wherein the first and second housing portions 12*a*, 12*b* include complementary edge profiles 118 constructed and arranged to close the housing in addition to being partially or fully separable such that sound emitting from a speaker within the housing may escape through the center of the housing via the gap between complementary edge profiles 118. The first and second housing portions 12*a*, 12*b* may be in operable communication with an optional slide system 72 such that the first and second housing portions 12*a*, 12*b* may slidably engaged with one another or partially or fully separated. While FIG. 9 depicts a housing implementing a crenelated complementary edge profile, many variations of the complementary edge profiles 118 are contemplated by this disclosure and may include other arrangements, such as, but not limited to, peak and valley patterns, sinusoidal patterns, straight edge profiles, or the like. A portion of the slide system 72 may include a drive mechanism 73 constructed and arranged to allow a user to turn a dial or wheel that operates a drive transfer 71 connected to each slide system such that the first housing portion 12*a* and the second housing portion 12*b* separate evenly from one another on the slide system 72.

Figure 10:
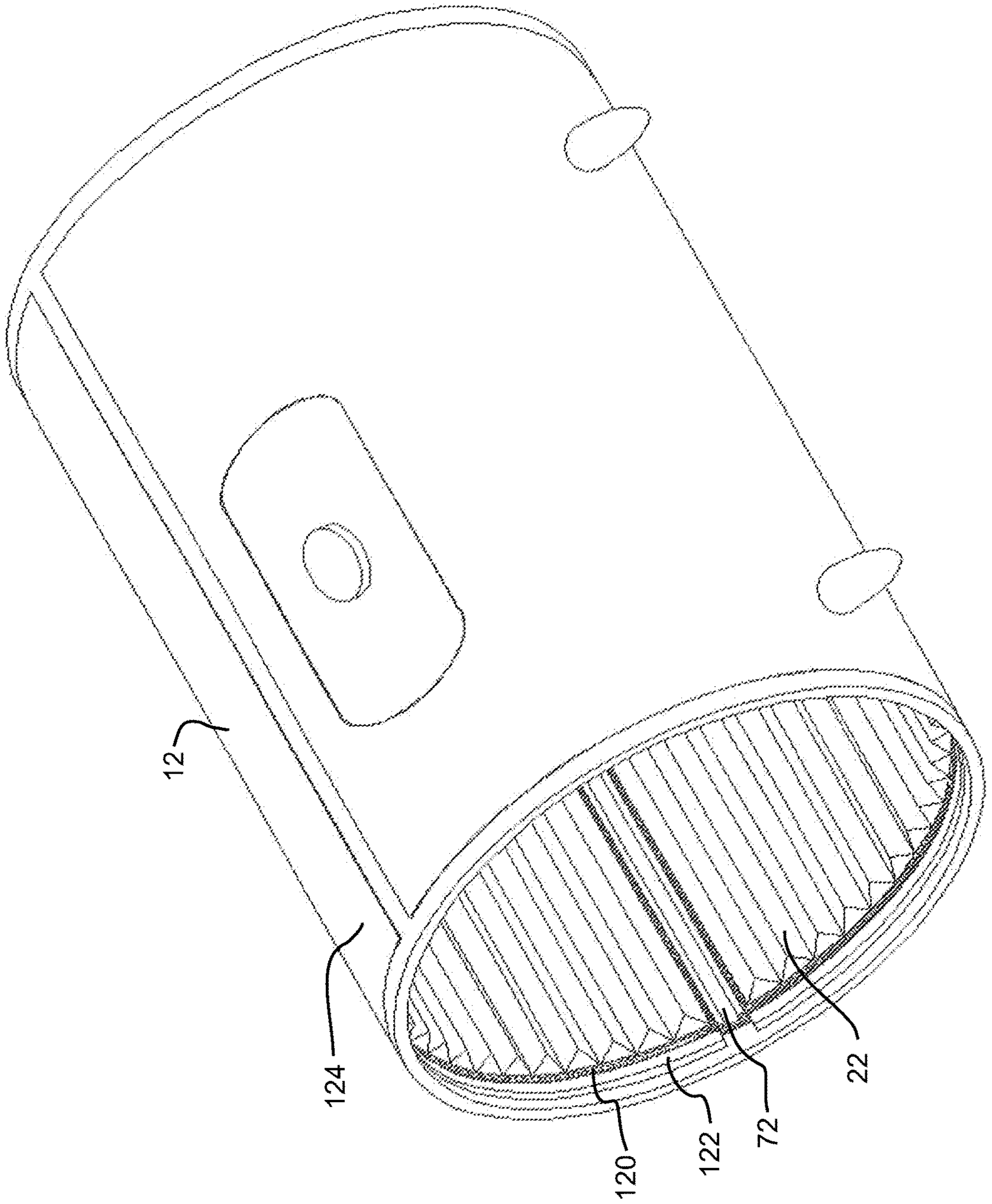
FIG. 10 depicts one variation of layered acoustic barriers and coverings within a sound management enclosure as described herein.

Referring to FIG. 10, the housing 12 may include a plurality of internal liners and external covers. The internal liner, as previously discussed in FIG. 2, may include a sound absorbing material 22 that may include one of or a combination of an internal felt liner 120 and an acoustic absorbing foam barrier 122. The internal felt liner 120 and an acoustic absorbing foam barrier 122 may include acoustic foam panels. The housing 12 may include an external cover 124 including vinyl and other coverings sold under the trademark Tolex, or a flexible, waterproof, vinyl, rubber, or polymer material. Various other materials known in the art may make up the internal liner and external cover which have not been explicitly disclosed but are considered to be a part of this disclosure.

Figure 11:
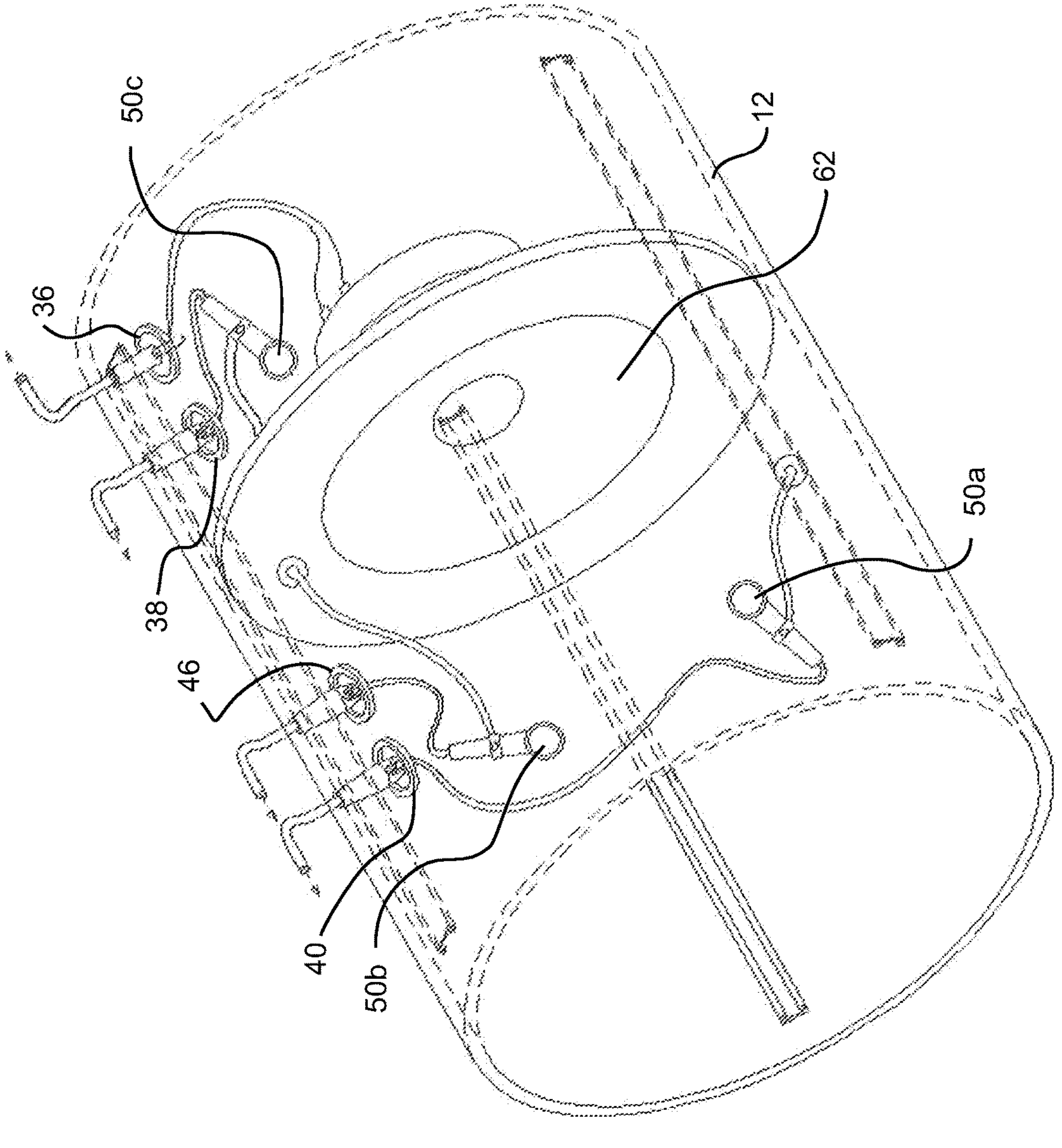
FIG. 11 depicts one variation of a sound management enclosure incorporating various inputs and outputs as described herein.

Referring to FIG. 11, a speaker 62 may be disposed within the housing 12 and may be in operable communication with various inputs and outputs 36, 38, 40, 46. At least one microphone, or a plurality of microphones 50*a*, 50*b*, and 50*c* may be disposed within the housing 12 and may be in operable communication with the with various outputs 38, 40, 46 such that sound emitted by the speaker 62 may be captured.

Figure 12:
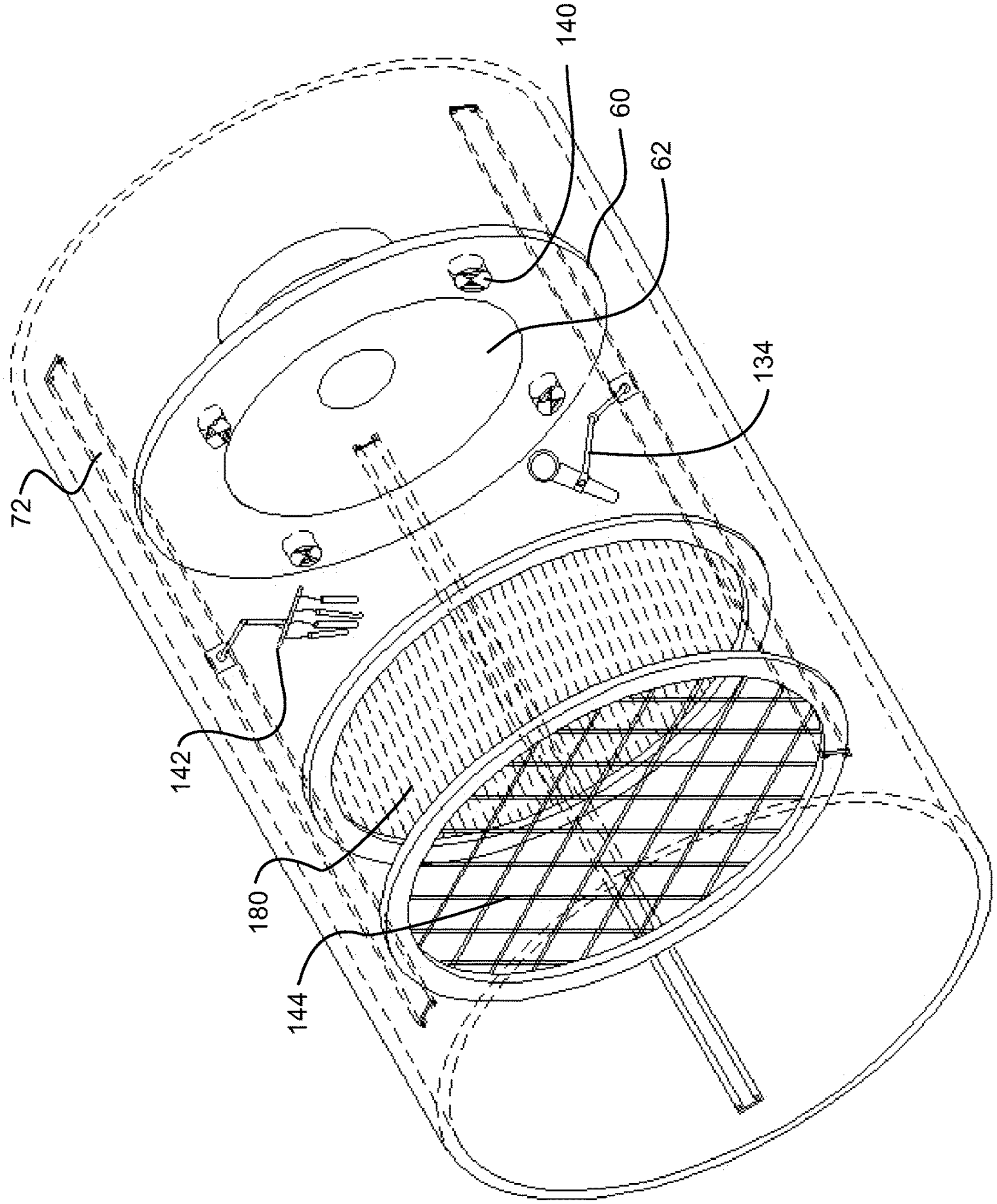
FIG. 12 depicts one variation of a sound management enclosure incorporating various effects, tools, baffles, screens, and other features as described herein.

Referring to FIG. 12, the speaker 62 may be mounted in a speaker mounting disc 60, which may be slidably attached to an optional slide system 72 as previously mentioned. The speaker mounting disc 60 may include a plurality of baffle vents 140. At least one microphone may be affixed at any mounting point within the housing via a mounting arm 134. Additional equipment, such as a dangle or chime 142, may be affixed at any mounting point within the housing to further enhance the recording of effects. Additional mounting rings may include a screen 180 or grill 144 such that audio from the speaker 62 may be filtered or emitted from the enclosure.

Figure 13A:
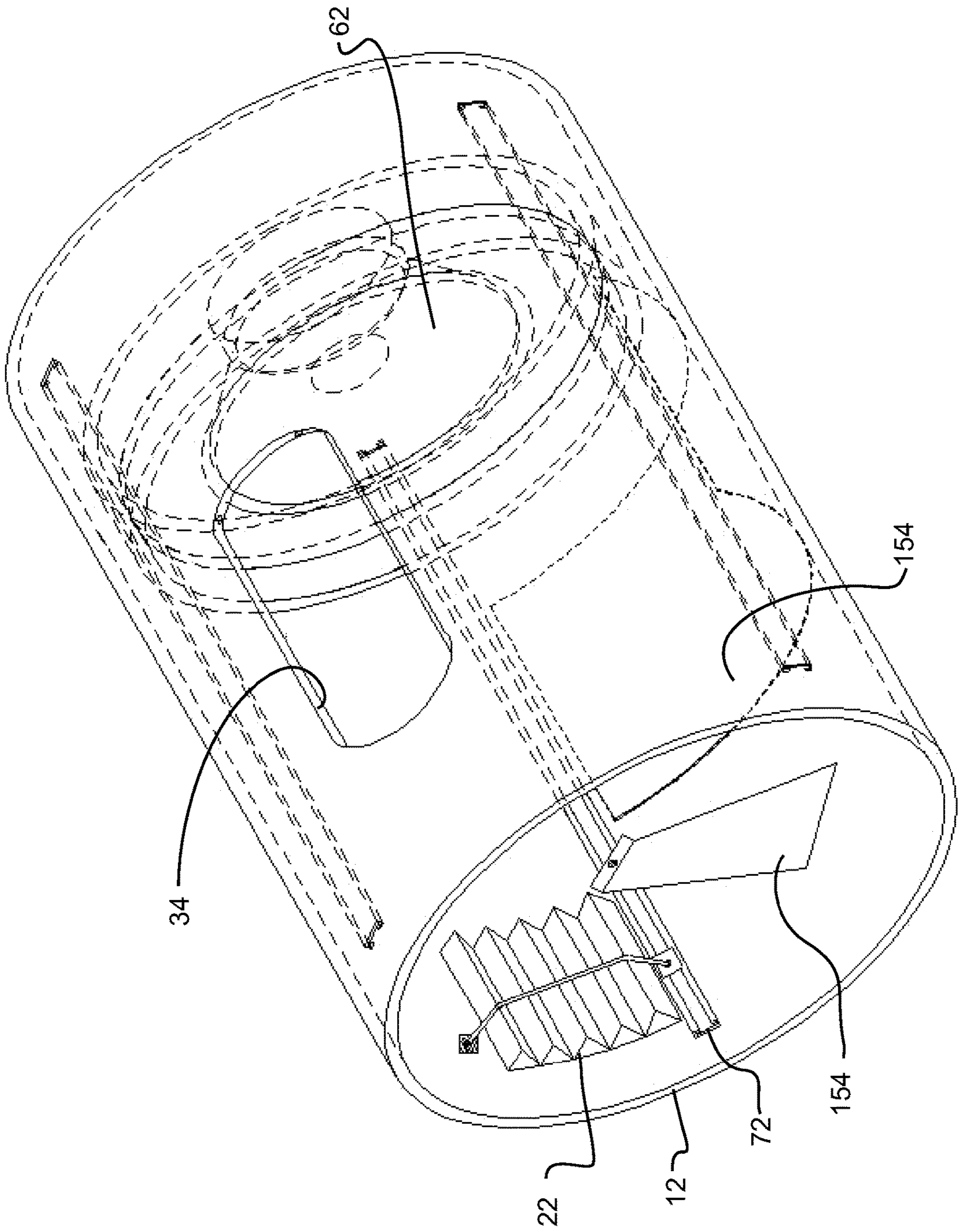
FIGS. 13A, 13B, and 13C depict variations of a sound management enclosure incorporating various sound management components and microphone wands as described herein.
Figure 13C:
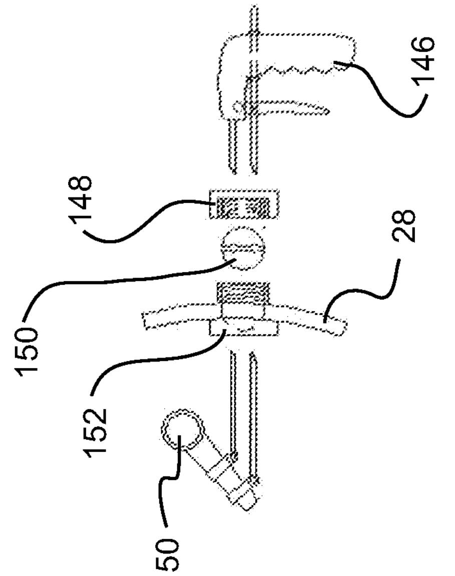
Figure 13B:
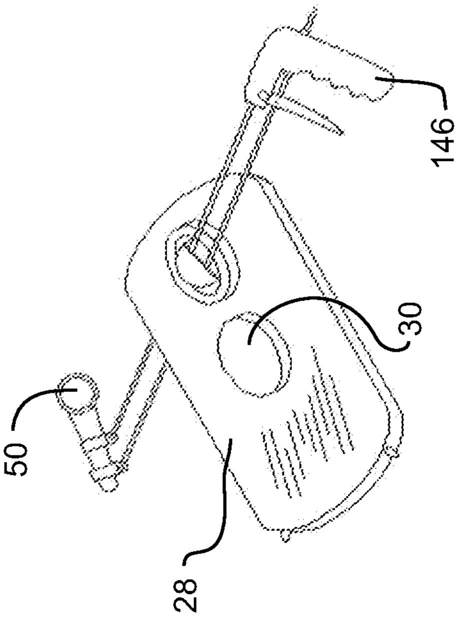

Referring to FIGS. 13*a*, 13*b*, and 13*c*, the sound management enclosure may include a speaker 62 disposed therein, the speaker 62 being mounted to an optional slide system 72 within the housing 12. Additional sound absorbing material 22 or reflective panels 154 may be disposed within the enclosure to reduce undesirable noise within the enclosure or increase intensity of desired noise via constructive and destructive sound wave management. The housing 12 may define an access port 34 which may receive an optional port door 28 which may include a locking mechanism 30 constructed and arranged to affix the port door 28 within the access port 34. The port door 28 may be constructed and arranged to allow a microphone wand 146 to be pivotably connected therethrough including a microphone 50 attached to one end of the microphone wand. The port door 28 may be constructed of a clear or semi-transparent material such as plexiglass to allow a user to view inside the enclosure. As best seen in FIGS. 13*b* and 13*c* the microphone wand 146 may include a wand mount 152 connected to the port door 28, a wand orbit ball 150, and a wand locking cap 148. The microphone wand 146 may be constructed and arranged to allow positioning and securing of the microphone 50 within the enclosure without the need to remove the port door 28 from the housing.

The present invention includes the description, examples, variations, and drawings disclosed; but it is not limited to such description, examples, variations, or drawings. As briefly described above, the reader should assume that features of one disclosed variation can also be applied to all other disclosed variations, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other variations will be apparent to a person of ordinary skill in the packaging arts, and all such modifications and other variations are intended and deemed to be within the scope of the present invention.

What is claimed is:

1. A sound management enclosure, comprising:

a generally symmetrical housing comprising a housing wall comprising an outer surface opposite an inner surface, the housing wall defining a generally cylindrical hollow therein and at least one access port to the generally cylindrical hollow;

an internal liner disposed on at least a portion of the inner surface, the internal liner being constructed and arranged to at least partially alter the absorption or reflection of sound; and a speaker mounted within the generally cylindrical hollow.

2. The sound management enclosure of claim 1, wherein the generally symmetrical housing is a double walled vacuum vessel.

3. The sound management enclosure of claim 1, further comprising:

a slide system onto which the speaker is mounted and which is constructed and arranged to allow movement of the speaker within the generally cylindrical hollow.

4. The sound management enclosure of claim 1, wherein the slide system is constructed and arranged to allow movement of the speaker along the longitudinal axis of the generally cylindrical hollow.

5. The sound management enclosure of claim 1, wherein the slide system is constructed and arranged to allow rotational movement of the speaker along a polar axis of the generally cylindrical hollow.

6. The sound management enclosure of claim 1, wherein the slide system is constructed and arranged to allow pitch or yaw movement of the speaker along a polar axis of the generally cylindrical hollow.

7. The sound management enclosure of claim 1, wherein the generally symmetrical housing comprises a first portion and a second portion sharing complementary edge profiles along at least a portion of the circumference of the general cylindrical housing such that the generally cylindrical housing may be at least partially separated along a portion of its circumference.

8. The sound management enclosure of claim 7, wherein the slide system is constructed and arranged to allow the first portion and second portion to slidably move away from and to one another independent of the speaker.

9. The sound management enclosure of claim 1, wherein the slide system is constructed and arranged to secure the speaker within the generally cylindrical hollow.

10. The sound management enclosure of claim 1, wherein the internal diameter of the housing is about equal to the diameter of at least one speaker.

11. The sound management enclosure of claim 1, further comprising an input in operable communication with the speaker.

12. A sound management enclosure, comprising:

a housing comprising a housing wall comprising an outer surface opposite an inner surface, the housing further comprising a first open end opposite a second open end, the housing wall defining a hollow therein and an access port defined by the wall of the housing;

a port door constructed and arranged to seal the access port;

an internal liner disposed on at least a portion of the inner surface, the internal liner being constructed and arranged to at least partially alter the absorption or reflection of sound; and a speaker mounted to the housing.

13. The sound management enclosure of claim 12, wherein the housing comprises a first portion and a second portion sharing complementary edge profiles along at least a portion of the circumference of the housing such that the housing may be at least partially separated along a portion of its circumference.

14. The sound management enclosure of claim 13, further comprising an input in operable communication with the speaker.

15. The sound management enclosure of claim 13, further comprising a microphone disposed within the hollow, the microphone being constructed and arranged to capture audio from the speaker.

16. A sound management enclosure, comprising:

a generally symmetrical housing comprising a housing wall comprising an outer surface opposite an inner surface, the housing further comprising a first open end opposite a second open end, the housing wall defining a generally cylindrical hollow therein and an access port defined by the wall of the housing;

a port door constructed and arranged to seal the access port;

an internal liner disposed on at least a portion of the inner surface, the internal liner being constructed and arranged to at least partially alter the absorption or reflection of sound;

a speaker mounted to the generally symmetrical housing;

an input in operable communication with the speaker; and a microphone disposed within the generally cylindrical hollow, the microphone being constructed and arranged to capture audio from the speaker.

17. The sound management enclosure of claim 16, further comprising:

a first end cap constructed and arranged to sealingly close the first open end; and a second end cap constructed and arranged to sealingly close the second open end.

18. The sound management enclosure of claim 16, further comprising at least one bulkhead slidably mounted to the generally symmetrical housing.

19. The sound management enclosure of claim 16, further comprising a microphone wand pivotably connect to the port door, the microphone wand at least partially passing there-through, wherein the microphone wand is constructed and arranged to allow positioning of a microphone within the enclosure without the need to remove the port door from the housing.

* * * * *